US008102977B2

(12) United States Patent
Baker et al.

(10) Patent No.: US 8,102,977 B2
(45) Date of Patent: *Jan. 24, 2012

(54) VOICEMAIL BOX WITH CALLER-SPECIFIC STORAGE FOLDERS

(75) Inventors: La Veria Baker, Atlanta, GA (US); David Scott, Norcross, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1279 days.

This patent is subject to a terminal disclaimer.

(21) Appl. No.: 11/805,091

(22) Filed: May 22, 2007

(65) Prior Publication Data

US 2007/0223661 A1    Sep. 27, 2007

Related U.S. Application Data

(63) Continuation of application No. 10/180,167, filed on Jun. 26, 2002, now Pat. No. 7,221,742.

(51) Int. Cl.
*H04M 1/64* (2006.01)
(52) U.S. Cl. .................. 379/88.22; 379/88.18
(58) Field of Classification Search ..... 379/88.08–88.27
See application file for complete search history.

(56) References Cited

U.S. PATENT DOCUMENTS

| | | | |
|---|---|---|---|
| 5,479,491 A | 12/1995 | Herrero Garcia et al. | 379/88 |
| 5,680,443 A | 10/1997 | Kasday et al. | 379/88.13 |
| 5,742,905 A | 4/1998 | Pepe et al. | 455/461 |
| 5,748,709 A * | 5/1998 | Sheerin | 379/88.22 |
| 5,797,124 A | 8/1998 | Walsh et al. | 704/275 |
| 5,884,262 A | 3/1999 | Wise et al. | 704/270 |
| 5,892,814 A * | 4/1999 | Brisebois et al. | 379/88.24 |
| 5,963,626 A | 10/1999 | Nabkel | 379/142 |
| 6,049,796 A | 4/2000 | Siitonen et al. | 707/3 |
| 6,069,940 A * | 5/2000 | Carleton et al. | 379/88.04 |
| 6,078,650 A | 6/2000 | Hansen | 379/52 |
| 6,091,947 A | 7/2000 | Sumner | 455/413 |

(Continued)

FOREIGN PATENT DOCUMENTS

EP    1 051 018 A2    11/2000

(Continued)

OTHER PUBLICATIONS

U.S. Office Action dated Aug. 25, 2005 in U.S. Appl. No. 10/178,276.

(Continued)

*Primary Examiner* — Simon Sing
*Assistant Examiner* — Assad Mohammed
(74) *Attorney, Agent, or Firm* — Thomas, Kayden, Horstemeyer & Risley, LLP (57) ABSTRACT

A method and system are provided for creating and utilizing caller-specific memory locations or folders within a single voicemail box of a telecommunications network-based voicemail system. A subscriber to voicemail services sets up a plurality of caller-specific memory locations or folders within her voicemail box for directing incoming messages to particular folders. Preferably, the folders are specific to particular callers based on the caller directory number or caller ID. The subscriber assigns a given folder with directory numbers of callers known to be associated with that folder. When a call comes in to the voicemail system with a directory number associated with a given folder, the voice message from that call is directed to and saved in the associated folder. If desired, personal identification numbers (PIN) may be assigned to each folder to control access to messages saved therein.

18 Claims, 4 Drawing Sheets

U.S. PATENT DOCUMENTS

| | | | |
|---|---|---|---|
| 6,097,941 A | 8/2000 | Helferich | 455/412.1 |
| 6,122,348 A | 9/2000 | French-St. George et al. | 379/88.23 |
| 6,125,376 A | 9/2000 | Klarlund et al. | 707/513 |
| 6,181,780 B1 | 1/2001 | Finnigan | 379/67.1 |
| 6,181,781 B1 | 1/2001 | Porter et al. | 379/88.17 |
| 6,226,362 B1 | 5/2001 | Gerszberg et al. | 379/88.13 |
| 6,233,318 B1 | 5/2001 | Picard et al. | 379/88.17 |
| 6,285,984 B1 | 9/2001 | Speicher | 705/14 |
| 6,292,480 B1 | 9/2001 | May | 370/352 |
| 6,301,608 B1 | 10/2001 | Rochkind | 709/206 |
| 6,332,020 B1 | 12/2001 | Mitchell et al. | 379/93.25 |
| 6,351,523 B1 | 2/2002 | Detlef | 379/88.14 |
| 6,368,205 B1 | 4/2002 | Frank | 453/413 |
| 6,374,223 B1 | 4/2002 | Donaldson et al. | 704/260 |
| 6,446,114 B1 | 9/2002 | Bulfer et al. | 709/206 |
| 6,459,774 B1 | 10/2002 | Ball et al. | 379/67.1 |
| 6,459,785 B1 * | 10/2002 | Naumburger | 379/214.01 |
| 6,487,277 B2 | 11/2002 | Beyda et al. | 379/88.01 |
| 6,519,327 B1 | 2/2003 | Cannon et al. | 379/88.22 |
| 6,522,727 B1 | 2/2003 | Jones | 379/88.23 |
| 6,522,879 B2 | 2/2003 | Myer et al. | 455/426.1 |
| 6,529,586 B1 | 3/2003 | Elvins et al. | 379/88.13 |
| 6,539,080 B1 | 3/2003 | Bruce et al. | 379/88.17 |
| 6,621,892 B1 | 9/2003 | Banister et al. | 379/88.14 |
| 6,625,258 B1 | 9/2003 | Ram et al. | 379/88.13 |
| 6,665,532 B1 | 12/2003 | Boland et al. | 455/413 |
| 6,683,940 B2 * | 1/2004 | Contractor | 379/88.17 |
| 6,697,459 B2 | 2/2004 | Finnigan | 379/88.18 |
| 6,718,015 B1 | 4/2004 | Berstis | 379/88.17 |
| 6,721,397 B1 | 4/2004 | Lu | 379/88.11 |
| 6,728,934 B1 | 4/2004 | Scopes | 715/513 |
| 6,744,867 B1 | 6/2004 | Chin et al. | 379/142.01 |
| 6,795,530 B1 | 9/2004 | Gilbert et al. | 379/76 |
| 6,801,763 B2 | 10/2004 | Elsey et al. | 455/404.1 |
| 6,807,257 B1 * | 10/2004 | Kurganov | 379/88.22 |
| 6,829,334 B1 | 12/2004 | Zirngibl et al. | 379/88.17 |
| 6,868,142 B2 | 3/2005 | Gupta et al. | 379/88.04 |
| 6,888,903 B1 | 5/2005 | Hartselle et al. | 379/88.22 |
| 6,888,930 B1 | 5/2005 | Hartselle et al. | |
| 6,928,148 B2 * | 8/2005 | Simon et al. | 379/39 |
| 6,940,958 B2 | 9/2005 | Clapper | 379/142.01 |
| 6,987,841 B1 | 1/2006 | Byers et al. | 379/88.17 |
| 7,046,772 B1 | 5/2006 | Moore et al. | 379/88.25 |
| 7,050,792 B2 | 5/2006 | Chou et al. | 455/412.2 |
| 7,072,452 B1 | 7/2006 | Roberts et al. | 379/88.23 |
| 7,190,950 B1 | 3/2007 | Baker et al. | 455/413 |
| 7,221,742 B1 | 5/2007 | Baker et al. | 379/88.23 |
| 7,286,653 B2 | 10/2007 | Hartselle et al. | 379/88.23 |
| 7,457,398 B2 * | 11/2008 | Candell et al. | 379/88.23 |
| 7,664,636 B1 * | 2/2010 | Hirschberg et al. | 704/231 |
| 2001/0027097 A1 | 10/2001 | I'Anson | 455/413 |
| 2001/0041590 A1 | 11/2001 | Silberfenig et al. | 455/556 |
| 2001/0053206 A1 | 12/2001 | Muller | 379/88.12 |
| 2002/0031207 A1 | 3/2002 | Lin | 379/88.17 |
| 2002/0069060 A1 | 6/2002 | Cannavo et al. | 704/257 |
| 2002/0077082 A1 | 6/2002 | Cruickshank | 455/413 |
| 2002/0131566 A1 | 9/2002 | Stark et al. | 379/88.19 |
| 2002/0143885 A1 | 10/2002 | Ross, Jr. | 709/207 |
| 2002/0147592 A1 | 10/2002 | Wilmont et al. | 704/270.1 |
| 2002/0159572 A1 | 10/2002 | Fostick | 379/88.14 |
| 2003/0018720 A1 | 1/2003 | Chang et al. | 709/206 |
| 2003/0039342 A1 | 2/2003 | Yafuso | 379/88.19 |
| 2003/0078035 A1 | 4/2003 | Sheha et al. | 455/414 |
| 2003/0119486 A1 | 6/2003 | Tari et al. | 455/412 |
| 2003/0135647 A1 | 7/2003 | Himmel et al. | 709/245 |
| 2003/0140090 A1 | 7/2003 | Rezvani et al. | 709/203 |
| 2003/0140091 A1 | 7/2003 | Himmel et al. | 709/203 |
| 2003/0142799 A1 | 7/2003 | Candell et al. | 379/88.13 |
| 2005/0136896 A1 | 6/2005 | Ward et al. | 455/413 |
| 2006/0083360 A1 | 4/2006 | Moore et al. | 379/88.14 |
| 2006/0083365 A1 | 4/2006 | Baker et al. | 379/88.22 |
| 2006/0171511 A1 | 8/2006 | Liu et al. | 379/67.1 |
| 2006/0233327 A1 | 10/2006 | Roberts et al. | 379/88.23 |

FOREIGN PATENT DOCUMENTS

| | | |
|---|---|---|
| EP | 1051018 A2 | 11/2000 |

OTHER PUBLICATIONS

U.S. Office Action dated Mar. 15, 2004 in U.S. Appl. No. 10/112,663.
U.S. Office Action dated Aug. 10, 2004 in U.S. Appl. No. 10/112,663.
U.S. Final Office Action dated Jun. 3, 2005 in U.S. Appl. No. 10/022,941.
U.S. Office Action dated Oct. 21, 2003 in U.S. Appl. No. 10/180,261.
U.S. Final Office Action dated Apr. 26, 2004 in U.S. Appl. No. 10/180,261.
U.S. Final Office Action dated Jun. 30, 2005 in U.S. Appl. No. 10/109,975.
U.S. Final Office Action dated Jul. 12, 2005 in U.S. Appl. No. 10/109,975.
U.S. Final Office Action dated Jan. 24, 2007 in U.S. Appl. No. 10/852,600.
U.S. Office Action dated Mar. 30, 2007 in U.S. Appl. No. 10/852,600.
International Telecommunication Union, Series T: Terminals for Telematic Services, "Procedures for the transfer of facsimile data via store-and-forward on the Internet," ITU-T Recommendation T.37, Jun. 1998, 13 pgs.
International Telecommunication Union, Series T: Terminals for Telematic Services, "Procedures for the transfer of facsimile data via store-and-forward on the Internet," Amendment 1: Full Mode, ITU-T Recommendation T.37—Amendment 1, Sep. 1999, 62 pgs.
International Telecommunication Union, Series T: Terminals for Telematic Services, "Procedures for the transfer of facsimile data via store-and-forward on the Internet," Amendment 2, ITU-T Recommendation T.37—Amendment 2, Mar. 2001, 5 pgs.
International Telecommunication Union, Series T: Terminals for Telematic Services, "Procedures for the transfer of facsimile data via store-and-forward on the Internet," Amendment 3, ITU-T Recommendation T.37 (1998)—Amendment 3, Nov. 2002, 5 pgs.
U.S. Office Action dated Jan. 11, 2008 in U.S. Appl. No. 10/028,618.
Copending U.S. Appl. No. 11/960,224, filed Dec. 19, 2007 entitled "Saving Information From Information Retrieval Systems".
U.S. Appl. No. 10/028,618, filed Dec. 20, 2001, entitled "Delivery of Wireless Messages to Wireline Interactive Devices", Inventors: Simpson.
U.S. Appl. No. 10/178,276, filed Jun. 24, 2002, entitled "Saving and Forwarding Customized Messages", Inventors: Roberts et al.
U.S. Appl. No. 10/022,941, filed Dec. 17, 2001, entitled "Method and System for Call, Facsimile and Electronic Message Forwarding", Inventors: Moore et al.
U.S. Appl. No. 10/109,975, filed Mar. 29, 2002, entitled "Transferring Voice Mail Messages in Text Format", Inventors: Eason.
U.S. Appl. No. 10/112,663, filed Mar. 29, 2002, entitled "Saving Information from Information Retrieval Systems", Inventors: Hartselle et al.
U.S. Appl. No. 10/180,149, filed Jun. 26, 2002, entitled "Categorization of Messages Saved on a Network-Based Voicemail System", Inventors: Baker et al.
U.S. Appl. No. 10/184,193, filed Jun. 27, 2002, entitled "Storage of Voicemail Messages at an Alternate Storage Location", Inventors: Baker et al.
U.S. Appl. No. 10/180,261, filed Jun. 26, 2002, entitled "Voicemail System with Subscriber Specific Storage Folders", Inventors: Baker et al.
Office Action issued on U.S. Appl. No. 10/109,975 on Aug. 25, 2004.
Office Action issued on U.S. Appl. No. 10/178,276 on Oct. 1, 2004.
U.S. Appl. No. 10/852,600, entitled "Saving Information from Information Retrieval Systems," filed May 24, 2004, Inventors: La Veria Baker, Vernon Meadows & David Scott.
U.S. Official Action dated Jan. 14, 2005 in U.S. Appl. No. 10/180,261.
U.S. Official Action dated Jan. 24, 2005 in U.S. Appl. No. 10/022,941.
U.S. Official Action dated May 4, 2005 in U.S. Appl. No. 10/184,193.
U.S. Official Action dated May 3, 2005 in U.S. Appl. No. 10/109,975.
U.S. Official Action dated May 18, 2005 in U.S. Appl. No. 10/178,276.
U.S. Final Official Action dated Jul. 18, 2005 in U.S. Appl. No. 10/180,261.
U.S. Official Action dated Oct. 4, 2005 in U.S. Appl. No. 10/028,618.

U.S. Official Action dated Oct. 20, 2005 in U.S. Appl. No. 10/852,600.
U.S. Final Official Action dated Nov. 4, 2005 in U.S. Appl. No. 10/184,193.
U.S. Official Action dated Dec. 16, 2005 in U.S. Appl. No. 10/109,975.
U.S. Final Official Action dated Apr. 20, 2006 in U.S. Appl. No. 10/852,600.
U.S. Official Action dated May 1, 2006 in U.S. Appl. No. 10/184,193.
U.S. Final Official Action dated May 22, 2006 in U.S. Appl. No. 10/028,618.
U.S. Official Action dated Jul. 14, 2006 in U.S. Appl. No. 10/109,975.
U.S. Official Action dated Oct. 17, 2006 in U.S. Appl. No. 10/852,600.
Baker; Non-Final Office Action mailed Jul. 26, 2010 for U.S. Appl. No. 11/295,078, filed Dec. 6, 2005.
Baker; Final Office Action mailed May 31, 2011 for U.S. Appl. No. 11/295,078, filed Dec. 6, 2005.
Baker; Final Rejection mailed Jan. 11, 2006 for U.S. Appl. No. 10/180,167, filed Jun. 26, 2002.
Baker; Final Rejection mailed Dec. 6, 2006 for U.S. Appl. No. 10/180,167, filed Jun. 26, 2002.
Baker; Non-Final Rejection mailed Jul. 11, 2006 for U.S. Appl. No. 10/180,167, filed Jun. 26, 2002.
Baker; Non-Final Rejection mailed Jul. 14, 2005 for U.S. Appl. No. 10/180,167, filed Jun. 26, 2002.
Baker; Notice of Allowance and Fees Due mailed Mar. 16, 2007 for U.S. Appl. No. 10/180,167, filed Jun. 26, 2002.
Baker; U.S. Appl. No. 10/180,167, filed Jun. 26, 2002.
Roberts; Final Rejection mailed Jun. 27, 2007 for U.S. Appl. No. 11/441,561, filed May 26, 2006.
Eason; Non-Final Rejection mailed Jul. 14, 2006 for U.S. Appl. No. 10/109,975, filed Mar. 29, 2002.
Eason; Non-Final Rejection mailed Dec. 16, 2005 for U.S. Appl. No. 10/109,975, filed Mar. 29, 2002.
Baker; Examiner Interview Summary mailed Aug. 10, 2004 for U.S. Appl. No. 10/180,261, filed Jun. 26, 2002.
Baker; Final Rejection mailed Apr. 26, 2004 for U.S. Appl. No. 10/180,261, filed Jun. 26, 2002.
Baker; Final Rejection mailed Jul. 18, 2005 for U.S. Appl. No. 10/180,261, filed Jun. 26, 2002.
Baker; Non-Final Rejection mailed Jan. 14, 2005 for U.S. Appl. No. 10/180,261, filed Jun. 26, 2002.
Baker; Non-Final Rejection mailed Oct. 21, 2003 for U.S. Appl. No. 10/180,261, filed Jun. 26, 2002.
Baker; Notice of Allowance and Fees Due mailed Nov. 4, 2005 for U.S. Appl. No. 10/180,261, filed Jun. 26, 2002.
Baker; U.S. Appl. No. 10/180,261, filed Jun. 26, 2002.

* cited by examiner

VOICEMAIL BOX WITH CALLER-SPECIFIC STORAGE FOLDERS

RELATED APPLICATION

This application is a Continuation of co-pending U.S. application Ser. No. 10/180,167 entitled "Voicemail Box with Caller-Specific Storage Folders" filed Jun. 26, 2002, which issued as U.S. Pat. No. 7,221,742 on May 22, 2007, which is incorporated herein by reference.

FIELD OF THE INVENTION

This invention relates to a method and system for providing caller-specific storage folders within a voicemail box of a voicemail system.

BACKGROUND OF THE INVENTION

In a typical voicemail system, calling parties attempt to reach a called party or a subscriber of the functionality of the voicemail system and are directed to the subscriber's voicemail box where a voice message may be left for the subscriber's subsequent review and use. Often, a number of voicemail system users have access to a single voicemail box to which all voicemail messages are left to all users of that voicemail box. For example, one voicemail box may be associated with a single telephone directory number to which all members of a family or multiple roommates in an apartment or dormitory receive voicemail messages. If a voicemail message is left for one member of the family, but the message is opened and reviewed by another member of the family, the intended recipient of the message may not receive the message or know that the message was left, and any privacy considerations associated with the message may be lost because the message is accessible by others who have access to the single voicemail box.

Accordingly, there is a need for a method and system for providing caller-specific folders within a single voicemail box to which voice messages from specific callers are deposited for subsequent review only by the intended recipient of those voice messages. It is with respect to these and other considerations that the present invention has been made.

SUMMARY OF THE INVENTION

Embodiments of the present invention are directed to a method and system for providing caller-specific memory locations or folders within a single voicemail box of a telecommunications network-based voicemail system. A subscriber to voicemail services sets up a plurality of caller-specific memory locations or folders within her voicemail box maintained at the voicemail system for directing incoming messages to particular folders. Preferably, the folders are specific to particular callers based on the caller directory number or caller ID.

The subscriber assigns a given folder with directory numbers of callers known to be associated with that folder. When a call comes in to the voicemail system with a directory number associated with a given folder, the voice message from that call is saved in the associated folder. If a given caller's directory number has not been assigned to a particular folder, a voice message from that caller is saved to a general voicemail folder accessible by all users who have access to the single voicemail box. Once the message from that caller is received and reviewed by one of the users who have access to the voicemail box, the user has the option of assigning future messages from that caller to one of the specific folders based on the directory number of that caller. Additionally, the user may then forward that message to the folder with which it has now been associated.

If desired, personal identification numbers (PIN) may be assigned to each folder to control access to messages saved therein. Embodiments of the present invention may be utilized to categorize messages by creating folders to which calls from particular categories of callers will be saved. For example, a folder may be set up for all messages from a given subscriber's medical professionals, such as doctors, dentists, optometrists, and the like. Accordingly, when voice messages are left from any telephone directory number of one of the subscriber's medical professionals where that telephone number has been associated with that particular folder, those voice messages will be saved in the appropriate folder within the single voicemail box.

These and other features and advantages, which characterize the present invention, will be apparent from a reading of the following detailed description and a review of the associated drawings. It is to be understood that both the foregoing general descriptions and the following detailed description are exemplary and explanatory only, and are not restrictive of the invention as claimed.

DETAILED DESCRIPTION

The following description of an embodiment of the present invention is made with reference to the above-described drawings wherein like numerals refer to like parts or components throughout the several figures. The present invention is directed to a method and system for providing caller-specific memory locations or folders within in a single voicemail box of a voicemail system.

Operating Environment

Figure 1:
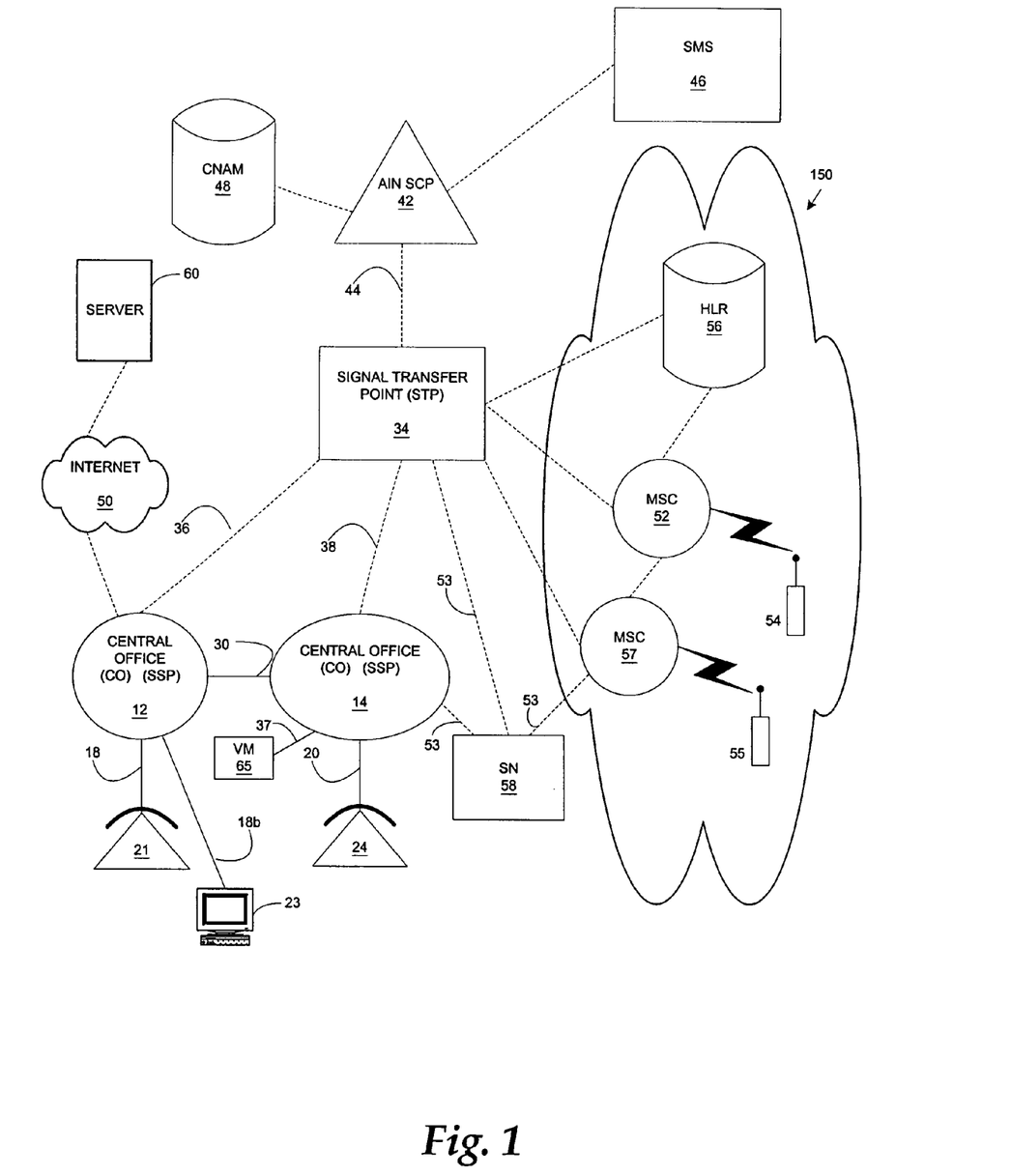
FIG. 1 is a simplified block diagram illustrating components of a wireline and wireless telecommunications network that provides an operating environment for the present invention.

FIG. 1 is a block diagram illustrating components of a wireline and wireless telephone network that provides an exemplary operating environment for the present invention. The public switched telephone network that evolved in the 1980s incorporated the advanced intelligent network (AIN). Some of the components of the advanced intelligent network are illustrated in FIG. 1. FIG. 1 is illustrative of at least a part of the advanced intelligent network (AIN) of a typical local exchange carrier integrated with components of a wireless network 150. The advanced intelligent network (AIN) uses the signaling system 7 (SS7) network for signal or system control message transport. The components thereof are well known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices are provided in a typical public switched telephone network. As shown in FIG. 1, each central office may include an electronic switch known to those skilled in the art as a service switching point (SSP). These are indicated in FIG. 1 as SSP switches 12 and 14. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as the trunk circuit 30.

As shown in FIG. 1, switches (SSP) 12 and 14 have a plurality of subscriber lines 18 and 20 connected thereto. Each of the subscriber lines 18 and 20 is connected to a terminating piece or pieces of customer premises equipment that are represented by telephones 21 and 24. A computer 23 also is illustrated as connected to the switch 12 via the subscriber line 18(b). The computer 23 is illustrative of a single or a plurality of computing and data storage devices. SSP switches 12 and 14 are connected by a plurality of trunk circuits 30. These are the voice path trunks that interconnect the central offices 12 and 14 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the enhanced features of the network, resides in the local service control point (SCP) 42 that is connected to signal transfer point 34 via SS7 data link 44. As is known to those skilled in the art, service control points, such as the SCP 42, are physically implemented by relatively powerful fault tolerant computers. Among the functions performed by the service control points is maintenance of network databases used in providing enhanced services. Service control points, such as SCP 42, normally implement high volume routing services, such as call forwarding and 800 number translation and routing. They are also used for maintenance of and providing access to high volume databases for authorization of billing, such as credit card number validations. In most local exchange carrier networks, service control points are only used for data base look up and routing services that take place prior to the logical completion of the call, i.e., the provision of a ringing signal to the called subscriber line and ring back to the calling subscriber.

Additional devices for implementing advanced network functions within the AIN are provided by regional STPs (not shown) and regional SCPs (not shown). The STP 34 is connected to the SSPs via connections 36, 38 and 40. Both the regional SCPs and the local SCP 42, which represent a plurality of local SCPs distributed throughout the AIN, are connected via respective data links to the SMS 46. The SMS 46 provides a centralized platform for remotely programming the various SCPs of the AIN so that a coordinated information processing scheme may be implemented for the AIN.

The modern Advanced Intelligent Network also includes service nodes (SN) such as the service node 58. Those skilled in the art are familiar with service nodes, which are physically implemented by the same types of computers that embody the SCP 42. In addition to the computing capability and data base maintenance features, service nodes 58 use ISDN lines and may include DTMF signal recognition devices, tone generation devices, text to speech (TTS) voice synthesis devices and other voice or data resources. As shown in FIG. 1, the connection is through the SSP. For example, SN 55 is connected to SCP 42 via ISDN links 53 to SSP 12, ISDN/SS7 protocol conversion in SSP 12, and SS7 links 38 and 44. According to a preferred embodiment, the ISDN links 53 serve as a primary rate interface (PRI) over which services may be provided to subscribers using wireline services such as the wireline telephone sets 21 and 24 and subscribers using wireless services such as the wireless units 54, 55, 60, and 62.

The voice mail system 65 is shown in FIG. 1 being functionally connected to the switch 14 and is a component of the network. That is, calls are routed to and from the voice mail system 65 at the control and direction of the network via such components as the SCP 42. The voice mail system 65 may be connected to the switch 14 via a PRI interface line 37 similar to the connection of the service node 58 to the switch 14. Alternatively, the line 37 may operate according to the Internet protocol (IP). In operation, the voice mail system 65 is treated like a switch 14 whereby calls directed to voice mail boxes maintained at the voice mail system 65 are directed to the voice mail system 65 as calls are directed to customer premises equipment, such as telephones, via switches 12, 14.

The voice mail system 65 typically includes a computer or collection of computers, recording and recording playback devices, and software for recording announcements for incoming calls, recording and playing back recorded messages, and for receiving incoming calls and for making outgoing calls at the direction of the network. In addition to the recording and playback functionality, the voice mail system 65 includes text-to-speech (TTS) and speech-to-text (STT) synthesis devices and software for conversion of analog voice messages to digitized forms such as WAV files and MP3 files. The voice mail system 65 has memory capacity for saving announcements to incoming callers and for saving messages from incoming callers. The computing system of the voice mail system 65 also includes an electronic mail server that may send and receive electronic mail via the network and the Internet 50.

The Internet 50 is well known to those skilled in the art as essentially a packet-switched network based on the family of protocols called Transmission Control Protocol/Internet Protocol (TCP/IP), a family of networking protocols providing communication across interconnected networks between computers with diverse hardware architectures and between various computer operating systems. Operation of the Internet 50 and the TCP/IP transmission protocols is well known to those skilled in the art.

The server 60 is illustrative of a computing system accessible via a distributed computing environment such as the Internet 50. The server 60 may include a computer or collection of computers along with associated software applications and memory capacity. The server 60 may serve as an Internet web server for maintaining and administering Internet web pages serving as an access point to the functionality of the present invention via the computer 23. For example, a user may use the computer 23 to access the functionality of the present invention by accessing an Internet web page maintained at the server 60 and operated by the provider of the functionality.

The wireless network 150, such as a cellular network, comprises a mobile switching center (MSC) 52. The MSC 52 is a switch providing services and coordination between wireless users in the network 150 and external networks. The MSC 52 may be connected to the STP 34 to provide information to the wireline network and receive information from the wireline network. The MSC 52 also communicates with a wireless subscriber, such as wireless telephones 54 and 55. The wireless telephones 54 and 55 are also illustrative of other wireless computing devices, such as pagers and personal digital assistants.

In operation, the intelligent network elements of the AIN, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP switches 12 and 14, a relatively small set of triggers are defined at the SSP switches for each call.

The message created by an SSP in response to the "firing" of a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP to route the held communication for connection with a terminating station. Query messages, conversation messages, and response messages are standard types of messages defined by the AIN protocol. The details of the AIN protocol are well known to those skilled in the art and will not be further described herein. For more information regarding the AIN protocol, see Bellcore Specification GR-1298-CORE Switching Systems Generic Requirements for AIN 0.1, which is incorporated herein by reference.

Operation

Figure 2:
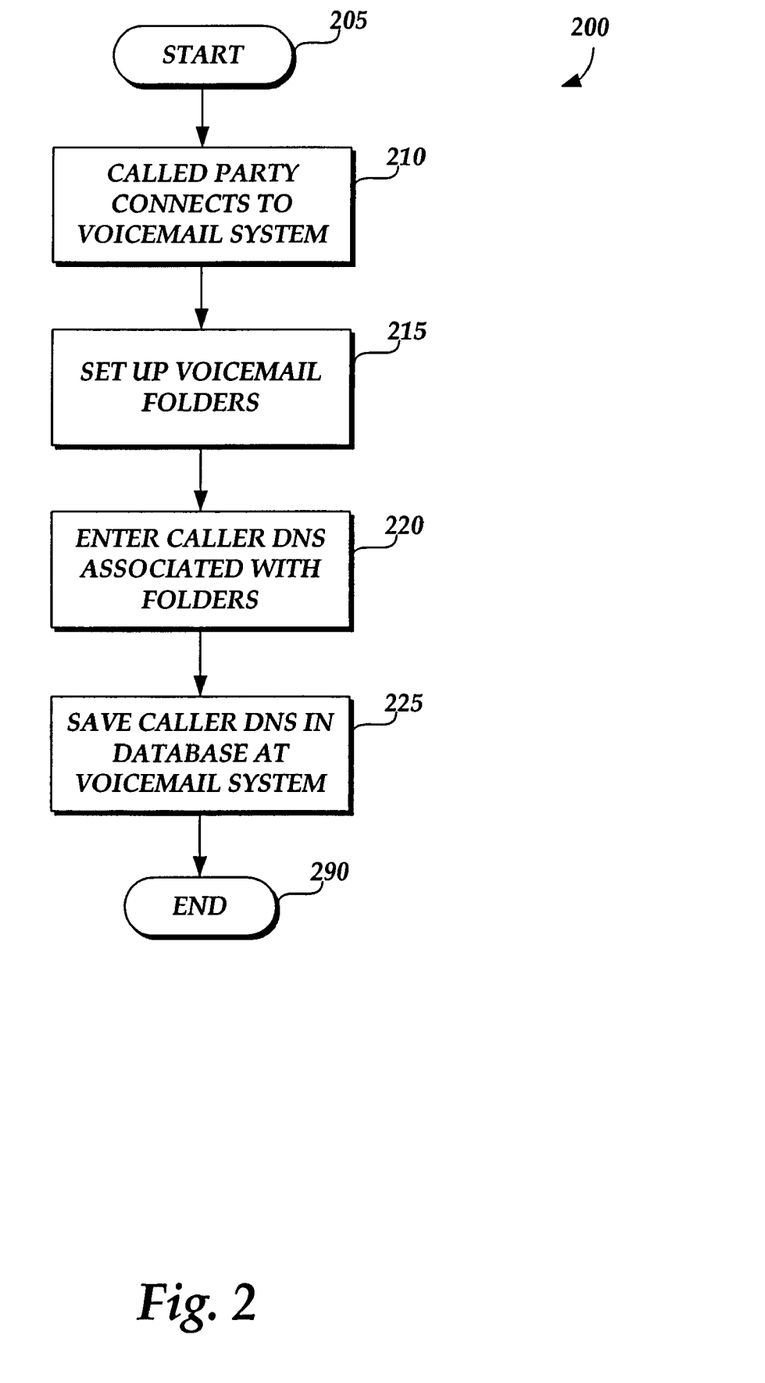
FIG. 2 illustrates the logical flow of the steps performed by a method and system of the present invention for creating voicemail folders within a single voicemail box and for associating telephone directory numbers of anticipated callers with those folders according to an embodiment of the present invention.

Having described an operating environment for the present invention with reference to FIG. 1, FIG. 2 illustrates a logical flow of the steps performed by a method and system of the present invention for creating voicemail folders within a single voicemail box and for associating telephone directory numbers of anticipated callers with those folders according to an embodiment of the present invention. The method 200 begins with start step 205 and proceeds to step 210 where the subscriber or called party connects to the voicemail system 65 in order to create folders within the voicemail box of the subscriber operated through the voicemail system 65. As should be understood, the subscriber, or called party in this case, may be one of a number of authorized users of a single voicemail box to which voice messages are saved for calls directed to the telephone directory number of the subscriber or to the multiple users utilizing the single voicemail box associated with that telephone directory number.

At step 215, a number of prompts may be received by the subscriber from the voicemail system 65, such as "To create a subfolder within your voicemail box, press 1." A second prompt may be provided, such as "Enter a name for the folder you are creating." In response to that prompt, the subscriber may speak a name such as, "Jane's folder," with which the subscriber will associate that folder during future use. Alternatively, the subscriber may enter an alpha-numeric code for identifying the folder, such as "1 2 3 4," using the subscriber's telephone keypad.

Next, a prompt may be provided to the subscriber such as, "Enter telephone directory numbers you wish to have associated with this folder followed by the pound sign." In response to this prompt, the user may begin entering the telephone directory numbers of callers whose voicemail messages she would like directed to the folder she is creating within the single voicemail box. For example, the user may enter the telephone directory numbers of all of her friends, acquaintances, work associates, and the like, whose voice messages she would like directed to the specific folder within the voicemail box. At step 225, the caller directory numbers are stored in a database at the voicemail system 65 so that the voicemail system 65 may search the database for caller directory numbers in order to direct voicemail messages from particular callers to associated voice message folders as prescribed by the subscriber or individual voicemail system user.

As described above, the subscriber may set up other voice message folders within the single voicemail box in order to categorize incoming voice messages into different voice message folders. For example, the subscriber may set up a voice message folder for all voice messages associated with medical professionals, or the subscriber may set up a voice message folder for all calls received from a particular relative.

If the subscriber does not create a caller-specific folder as set forth above, the subscriber may create a caller-specific folder after a message is received from a caller from which the subscriber has never received a message before. That is, if the subscriber receives a message from a new acquaintance, the subscriber may then elect to have future messages from that new acquaintance saved to a particular voice message folder after reviewing the voice message for the first time.

Referring to steps 210 through 225, according to an alternative embodiment, the subscriber to voicemail services or a particular user of a given voicemail box may contact the voicemail system and set up the voice message folders, via an Internet-based web page provided by the telecommunications service provider of the voicemail system 65. The subscriber or user opens the Internet-based web page of the provider of the voicemail system 65 at the subscriber's computer 23 via the Internet 50 to open the web page maintained at a remote server 60, illustrated in FIG. 1. Once the web page of the voicemail system provider is open, the subscriber may create a number of voice message folders within a single voicemail box. After the subscriber has created the required number of folders, the folders may be named, and a number of telephone directory numbers of anticipated callers may be associated with given folders so that future voice messages from those callers will be directed to and saved in the associated folders within the voicemail box.

Figure 3:
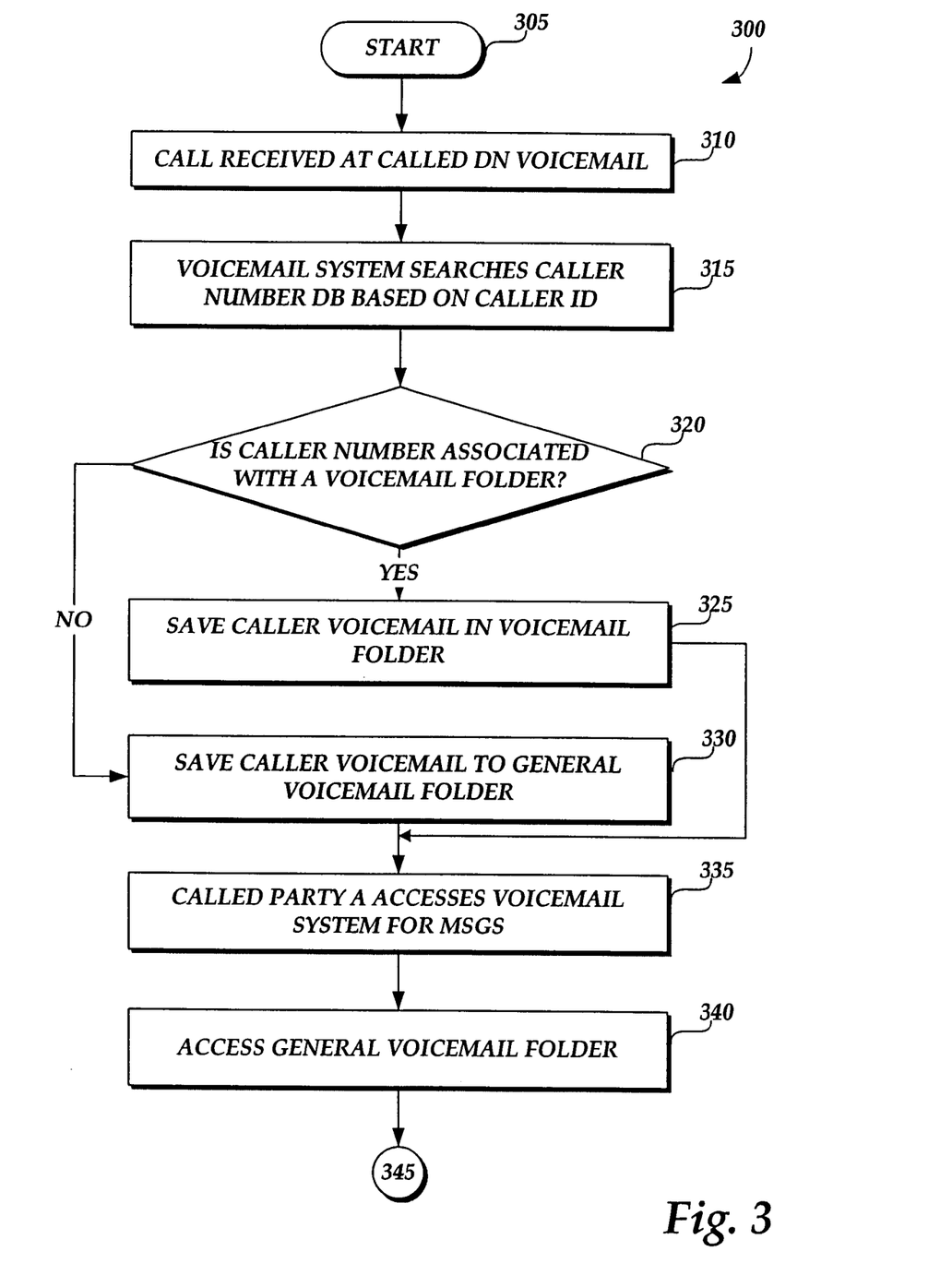
FIGS. 3 and 4 illustrate a logical flow of the steps performed by a method and system of the present invention for receiving and storing voice messages to voice message folders contained within a single mailbox of a voicemail system according to an embodiment of the present invention.
Figure 4:
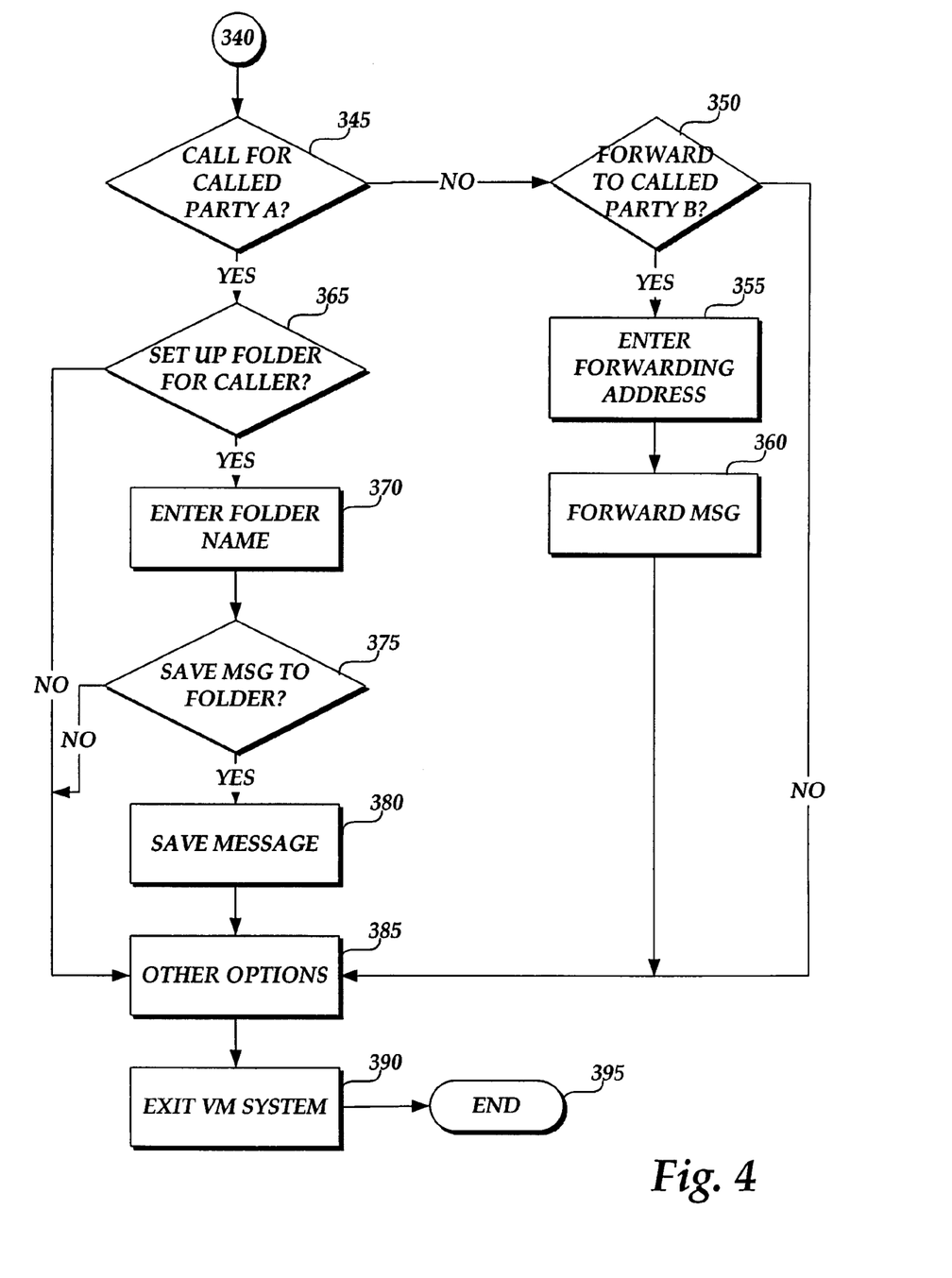

FIGS. 3 and 4 illustrate a logical flow of the steps performed by a method and system of the present invention for receiving and storing voice messages to voice message folders contained within a single mail box of a voicemail system according to an embodiment of the present invention. The method 300 begins at start step 305 and proceeds to step 310 where a call directed to the subscriber's or called party's directory number is received at the subscriber's switch 12. After an indication that the call will not be answered either by the receipt of a busy signal or by an indication of an unanswered call where a prescribed number of rings has been exceeded, the call is forwarded to the voicemail system 65 so that the calling party may leave a voice message for the subscriber or called party. At step 315, the voicemail system 65 receives the call from the calling party over the PRI interface 37 between the switch 14 and the voicemail system 65. As is understood by those skilled in the art, the telephone directory number associated with the incoming call travels with the incoming call to the voicemail system 65.

At step 315, the voicemail system 65 obtains the telephone directory number of the incoming call and performs a database search to determine whether the telephone directory number of the incoming call is associated with a particular voice message folder associated with the voicemail box of the subscriber or called party telephone number. At step 320, the determination is made as to whether the caller's telephone directory number is associated with a voice message folder. If the caller's telephone directory number is associated with a voice message folder within the subscriber's or called party's voicemail box, the method proceeds to step 325, and the voice message left by the calling party is saved in the voice message folder associated with the calling party's telephone directory number. For example, if the calling party is the brother of the called party, and the called party created a personal voice message folder to which she associated the telephone directory number of her brother, the brother's voice message is deposited into the personal voice message folder created by the called party. Now, the subscriber/user may open her personal voice message folder to hear messages left by her brother. According to an embodiment of the invention, the user obtains access to the folder by entering a personal identification number associated with the folder.

Referring back to step 320, if the telephone directory number of the calling party is not associated with a particular voice message folder within the voicemail box of the called party, the method proceeds to step 330 and the caller's voicemail message is saved to the general voicemail box which may be accessed by all authorized users of the voicemail box. At step 335, called party A, which may be any user of the subscriber's voicemail box who is authorized to access messages contained in the voicemail box, accesses the voicemail system 65 to obtain messages from the subscriber's voicemail box. At step 340, called party A accesses the general voicemail box in which voicemail messages are saved that are not associated with a particular voice message folder within the voicemail box. At step 345, a determination is made as to whether the first message opened by called party A was actually directed to called party A. For example, the first message opened by called party A from the general voicemail box may have been directed to called party B who may be the roommate of called party A. If the first message opened by called party A was not directed to called party A, the method proceeds to step 350 and a determination is made as to whether called party A desires to forward the message to a voice message folder of called party B who was the intended recipient of the message. If not, the method proceeds to step 385 and other voicemail system options including saving, deleting, or skipping the message are provided to called party A. Called party A may then exit the voicemail system 65 at step 390 and the method ends at step 395.

If called party A desires to forward the voice message to a voice message folder of called party B for whom the message was intended, the method proceeds to step 355 and called party A may enter a forwarding address to forward the message to called party B's voice message folder. As should be understood, when the voice message folders for each called party are created, identification numbers may be assigned to each voice message folder so that messages may be forwarded to those voice message folders by entry of the identification number. Alternatively, at step 355, the voicemail system 65 may present the called party A with a variety of options including the option to forward the message to a different voice message folder within the voicemail box. For example, the voicemail system 65 may be present a prompt such as, "If you would like to hear a list of voice message folders maintained in this voicemail box, press 1," or "If you know the identification number of the voice message folder to which you would like to forward the message, enter the identification number followed by the pound sign." At step 360, the called party A forwards the message to the voice message folder of called party B and the method proceeds to step 385, as described above.

Referring back to step 345, if the voice message opened by called party A was opened from the general voice message folder, and therefore, was not saved to a particular voice message folder, the method proceeds to step 365. At step 365, a determination is made as to whether called party A would like to set up a new folder associated with the directory number of the calling party or whether called party A would like to associate the directory number of the calling party with an existing voice message folder. According to an embodiment of the present invention, a series of prompts may be provided to called party A such as, "Would you like to associate the calling party with an existing voice message folder within your mail box?", or "Would you like to create a new voice message folder within your voicemail box associated with the calling party?"

If called party A would like to set up a new folder or associate the calling party with an existing folder, the method moves to step 370. At step 370, called party A may either enter the name of an existing voice message folder or the called party A may select to create a new folder. In response, the voicemail system 65 creates a new memory location within the voicemail box of the subscriber and associates the calling party's telephone directory number with the new voice message folder. Alternatively, the voicemail system 65 associates the calling party's telephone directory number with an existing voice message folder selected by the called party A. Accordingly, future voice messages left by the calling party will be saved in the voice message folder designated by the called party A for storing messages from this calling party.

At step 375, a determination is made as to whether the present voice message being reviewed by called party A should be saved to the newly created voice message folder or to the existing folder to which the calling party's telephone directory number has been associated. If so, the method proceeds to step 380, and the message is saved to the designated voice mail message folder. If not, the method moves to step 385 and the called party is provided with other options, including saving the message to a different voice message folder, deleting the message, skipping the message, and the like. At step 390, the calling party A exits the voice mail system 65, and the method ends at step 395.

As described, a method and system are provided for creating caller-specific memory locations or folders within a single voicemail box of a voicemail system to which voice messages may be saved based on the telephone directory numbers associated with calling parties. It will be apparent to those skilled in the art that various modifications and variations may be made in the present invention without the departing from the scope or spirit of the invention. Other embodiments of the invention will be apparent to those skilled in the art from consideration of the specification and practice of the invention disclosed herein.

We claim:

1. A method of storing voicemail messages to caller specific voice message folders, comprising:
   receiving a call from a calling party to a voicemail system containing a plurality of voice message folders;
   when the voicemail system has a voice message folder associated with the calling party's telephone directory number, saving a voice message from the calling party in the voice message folder associated with the calling party's telephone directory number;
   when the voicemail system does not have a voice message folder associated with the calling party's telephone directory number;
   saving the voice message from the calling party in a general voice message folder,
   accessing the general voice message folder to retrieve a voice message saved therein wherein accessing the general voice message folder is initiated by a user,
   determining, based upon input received from the user, whether to create a specific voice message folder associated with the voice message retrieved from the general voice message folder; and
   creating the specific voice message folder associated with the telephone directory number associated with the voice message retrieved from the general voice message folder; and
   saving the voice message retrieved from the general voice message folder to the specific voice message folder.

2. The method of claim 1, further comprising creating a plurality of voice message folders.

3. The method of claim 2, wherein creating a plurality of voice message folders further creating the plurality of voice message folders via an internet-based web page for accessing the voicemail system.

4. The method of claim 2, further comprising entering an identification for each of a plurality of voice message folders, wherein entering an identification for each of the plurality of voice message folders further comprises entering a name for each of the plurality of voice message folders.

5. The method of claim 2, further comprising entering an identification for each of a plurality of voice message folders, wherein entering an identification for each of the plurality of voice message folders further comprises entering an alphanumeric identification code far each of the plurality of voice message folders.

6. The method of claim 2, further comprising:
   accessing the general voice message folder to retrieve a voice message saved therein;
   determining whether the voice message should be saved to one of the plurality of voice message folders;
   if the voice message should be saved to one of the plurality of voice message folders, designating the one of the plurality of voice message folders for saving the voice message; and
   saving the voice message to the designated voice message folder.

7. The method of claim 6, wherein designating the one of the plurality of voice message folders further comprises entering at the voicemail system the identification associated with the designated voice message folder.

8. The method of claim 6, wherein if the voice message should not be saved to one of the plurality of voice message folders, further comprising:
   determining whether the voice message should be forwarded to a voice message folder of a different called party;
   if the voice message should be forwarded to a different called party, entering at the voicemail system, a voice message folder identification associated with the different called party: and
   forwarding the voice message to the voice message folder of the different called party.

9. The method of claim 1, further comprising saving the telephone directory numbers and associated voice message folder identifications at the voicemail system.

10. The method of claim 1, further comprising associating a personal identification number with each of a plurality of voice message folders for accessing each of the plurality of voice message folders.

11. The method of claim 10, after saving the voice message from the calling party in the voice message folder associated with the calling party's telephone directory numbers, further comprising accessing the voice message folder associated with the calling party's telephone directory number to review the voice message from the calling party.

12. The method of claim 11, prior to accessing the voice message folder associated with the calling party's telephone directory number, further comprising entering a personal identification number associated with the voice message folder associated with the calling party's telephone directory number to obtain access to the voice message folder associated with the calling party's telephone directory number.

13. The method of claim 1, further comprising at the voicemail system searching for a voice message folder associated with the calling party's telephone directory number.

14. The method of claim 13, further comprising:
   accessing the general voice message folder to retrieve a voice message saved therein;
   determining whether to create a specific voice message folder associated with the voice message retrieved from the general vice message folder;
   creating a specific voice message folder associated with the telephone directory number associated with the voice message retrieved from the general voice message folder; and
   saving the voice message retrieved from the general voice message folder to the specific voice message folder.

15. The method of claim 14, prior to saving the voice message retrieved from the general voice message folder to the specific voice message folder, further comprising saving the telephone directory number and an associated voice message folder identification for the specific voice message folder at the voicemail system.

16. A voicemail system for storing voicemail messages to caller specific voice message folders, comprising:
   means for receiving a call from a calling party;
   means for saving a voice message from the calling party in the voice message folder associated with the calling party's telephone directory number when the voicemail system locates a voice message folder associated with the calling party's telephone directory number;
   means for saving the voice message from the calling party in a general voice message folder, when the voicemail system does not locate the voice message folder associated with the calling party's telephone directory number;
   means for allowing access to a general voice message folder to retrieve a voice message saved therein;
   means for creating a specific voice message folder associated with the telephone directory number associated with the voice message retrieved from the general voice message folder, when the voicemail system does not locate the voice message folder associated with the calling party's telephone directory number;

means for saving the voice message retrieved from the general voice message folder to the specific voice message folder, when the voicemail system does not locate the voice message folder associated with the calling party's telephone directory number.

17. The voicemail system of claim 16, wherein the voicemail system further comprises:

means for allowing access to the general voice message folder to retrieve a voice message saved therein;

means for receiving a designation of one of the plurality of voice message folders for saving the voice message when the voice message should be saved to one of the plurality of voice message folders; and means for saving the voice message to the designated voice message folder.

18. The voicemail system of claim 16, wherein when the voice message should not be saved to one of the plurality of voice message folders, the voicemail system further comprises:

means for receiving a voice message folder identification associated with a different called party if the voice message should be forwarded to the different called party; and means for forwarding the voice message to the voice message folder of the different called party.

* * * * *